UNITED STATES PATENT OFFICE.

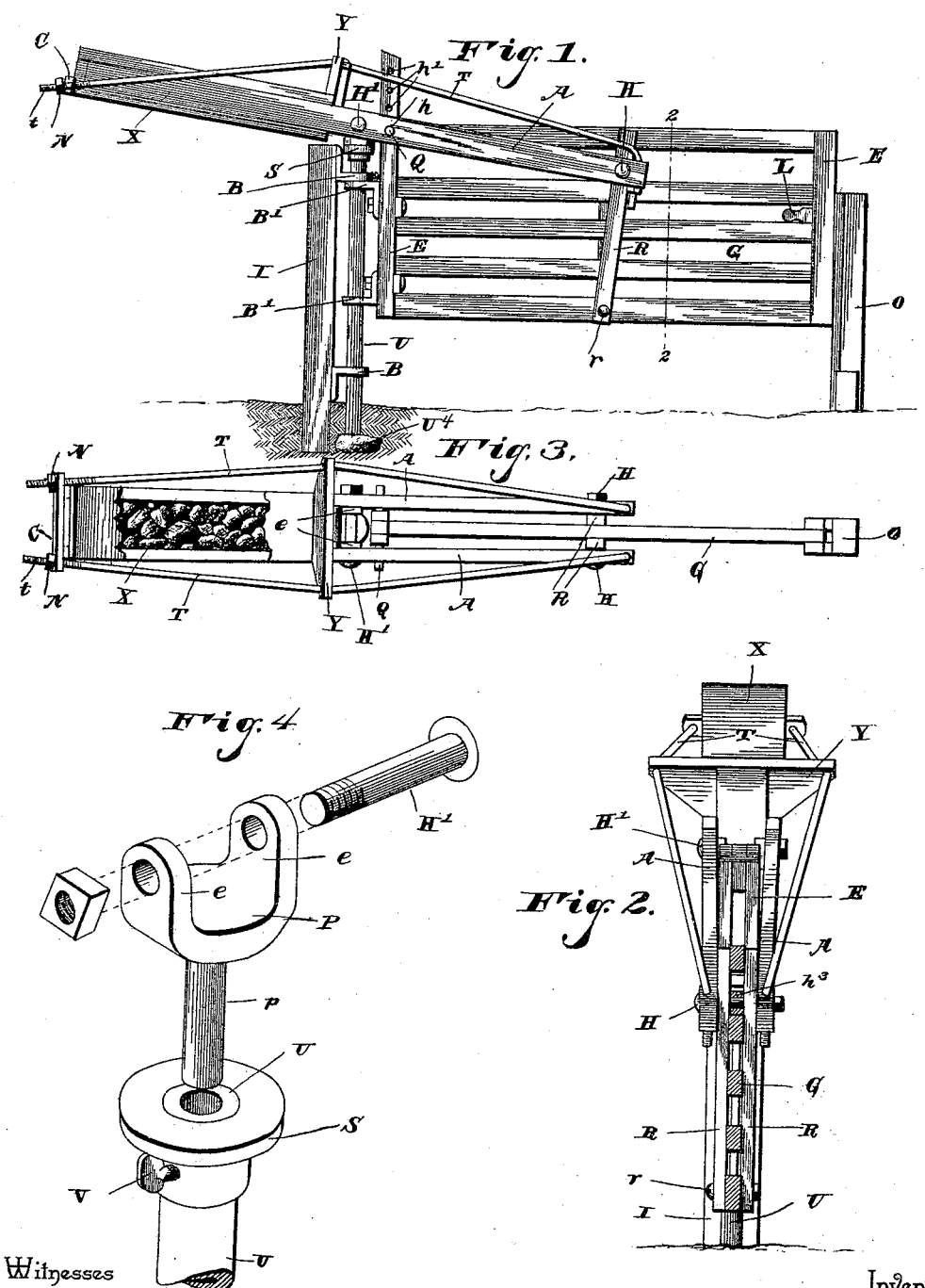

MORTIMER YAKLEY, OF DEXTER, MICHIGAN.

GATE.

SPECIFICATION forming part of Letters Patent No. 460,622, dated October 6, 1891.

Application filed October 8, 1890. Renewed August 21, 1891. Serial No. 403,471. (No model.)

*To all whom it may concern:*

Be it known that I, MORTIMER YAKLEY, a citizen of the United States, residing at Dexter, in the county of Washtenaw and State of Michigan, have invented a new and useful Gate, of which the following is a specification.

This invention relates to farm-gates; and the object of the same is to produce a gate pivoted upon a vertical rod so as to swing upon the same, and also supported by a counterbalancing-weight, so as to be capable of being raised and lowered upon the said rod in order that the gate may swing over snow and ice on the ground or that it may swing sufficiently high above the ground to allow the passage beneath it of small stock, such as sheep and swine.

With this object in view the invention consists of the details of construction hereinafter more fully described and claimed as new, and as illustrated in the drawings, in which—

Figure 1 is a side elevation of my improved gate, showing it raised and closed. Fig. 2 is a section on the line 2 2 of Fig. 1, looking toward the hinge. Fig. 3 is a plan view of the gate closed. Fig. 4 is a perspective detail, considerably enlarged, of the pivot-pin supporting the gate and the socket on which said pivot is supported.

Referring to the said drawings, the letter I designates the inner and O the outer post, which are to form parts of the fence in which the gate is located.

G is the gate proper, composed of end bars E and horizontal rails, the inner end bar rising slightly above the top rail and the outer end bar being provided with any suitable latch L to engage the outer post. Resting on a block of stone $U^4$ at the bottom of the post-hole and mounted in brackets B upon the inner side of the inner post I is an upright tube U, having a socket S surrounding its upper end, and held flush therewith by a set-screw V, and brackets B' are secured to the rear face of the inner end bar E of the gate and slide loosely upon said tube U, the brackets B' being set at a less distance apart than the brackets B in order to permit the gate to slide vertically to the desired extent.

A A are a pair of arms between whose outer ends is a long box X, adapted to be filled with stone or other weights to a suitable degree, and between the inner ends of these arms, on a horizontal bolt H, are pivoted the upper ends of two bars R, whose lower ends are pivoted to the lower rails of the gate at about the center of its length, the bolt H passing through a block $h^3$, which moves longitudinally of the gate between the upper two rails thereof, while the bars R turn upon the pivot $r$ at their lower ends.

H' is a horizontal bolt passing through the arms A A at about the point shown, and upon that bolt, between the arms, are pivoted two ears $e$, rising from a plate P. Depending from this plate is a pin $p$, adapted to fit and turn loosely in the socket S at the upper end of the upright rod U.

The arms A are provided at about their centers with a yoke Y, rising and diverging from them, and truss-rods T connect the ends of each arm and pass intermediately through holes in the outer corners of said yoke. The rear ends of these truss-rods are threaded, as shown at $t$, and nuts N engage said threads and bear against a cross-piece C upon the outer ends of the arms. By this means when the nuts are turned the truss-rods T are tightened, as will be clearly understood. The inner end bar E of the gate preferably rises above the top rail thereof, and its upper end passes freely between the two arms A, and through these arms is formed a pair of holes $h$, adapted to register with holes $h'$, formed through said end bar at vertically different points. By this means a pin or bolt Q can be inserted through the registering-holes $h\ h'$ to maintain the gate at any desired height and to prevent an automatic vertical movement thereof after it has been set. The use of the truss-rods T and of the locking-holes $h\ h'$ is, however, only preferable, and they may be dispensed with without departing from the essential principles of my invention.

A gate of the above construction may be raised and lowered by the smallest child, because it is so evenly balanced by the weights in the box X, and after it is adjusted vertically the insertion of the pin Q will hold it at the desired position. The truss-rods T prevent the springing or bending of the arms A under the influence of the weight at one and the gate at the other side of the pivot. By reason of the fact that the two ends of the arms A are so evenly balanced it will be apparent that the force exerted upon the upright rod U will be only in a downward direction. Hence the disagreeable tilting of the inner gate-post, so common heretofore, will be avoided, and the free end of the gate will be prevented from sagging, so as to escape the ground or so as to bind against the outer gate-post and prevent the successful operation of its latch. The latch which I prefer to use for my gate is merely a sliding bolt L, whose tip, when the bolt is projected, takes between two vertical strips on the outer post, having a groove between them; but as this forms no part of the present invention I make no claim thereto.

What is claimed as new is—

1. In a gate, the combination, with the inner post I, the brackets B thereon, the upright tube U, steadied in said brackets, resting on a foundation-stone beneath the ground and having a socket S at its upper end, the gate proper G, and the brackets B' on its inner end bar, moving vertically on said tube, of the arms A A, a pivot between their ends turning in said socket, a weighted box X at their outer ends, the bars R, pivoted at $r$ to the lower rail of the gate at about its center, and the horizontal bolt H, connecting the upper ends of said bars with the inner ends of said arms and moving between the two upper rails of the gate, substantially as specified.

2. In a gate, the combination, with the upright tube U, having a socket S at its upper end, the gate proper C, whose inner end bar E rises above the upper rail and is provided with transverse holes $h'$, and brackets B' on said end bar, turning and sliding vertically on said tube, of the arms A A, pivotally connected at their inner ends with the body of the gate, passing outside said inner end bar E and there provided with a hole $h$, adapted to register with the holes in said end bar, and having weighted outer ends X, a pivot-pin between said arms, turning in said socket, and a pin passing through said registering-holes, as and for the purpose set forth.

3. In a gate, the combination, with the upright tube U, having a socket S at its upper end, and the gate proper G, having brackets B' on its inner end bar turning and sliding vertically on said tube, of the arms A A, pivotally connected at their inner ends with the body of the gate and having weighted outer ends X, a pivot-pin between said arms, turning in said socket, a yoke Y, rising from said arms between their ends, truss-rods connected to the inner ends of said arms, passing through holes in said yoke, and having threaded outer ends $t$, a cross-bar C on the outer ends of said arms, and nuts on the threaded ends of said truss-rods impinging against said cross-bar, as and for the purpose set forth.

In testimony that I claim the foregoing as my own I have hereto affixed my signature in presence of two witnesses.

MORTIMER YAKLEY.

Witnesses:
HENRY W. BOOTH,
GEORGE W. SACKETT.